Jan. 25, 1949.   M. L. HARBAUGH   2,460,083
REACTION TANK WITH FLAKER
Filed Oct. 14, 1944

Max L. Harbaugh   INVENTOR.

BY Albert B. Griggs
ATTORNEY

Patented Jan. 25, 1949

2,460,083

UNITED STATES PATENT OFFICE 2,460,083

REACTION TANK WITH FLAKER

Max L. Harbaugh, Cleveland, Ohio, assignor to E. I. du Pont de Nemours & Company, Wilmington, Del., a corporation of Delaware Application October 14, 1944, Serial No. 558,710

2 Claims. (Cl. 23—285)

This invention relates to the manufacture of thiodiphenylamine and is more particularly directed to apparatus and processes for the continuous production of thiodiphenylamine by the reaction of diphenylamine and sulfur.

It is an object of the present invention to provide an apparatus and process whereby diphenylamine and sulfur may continuously be reacted to produce thiodiphenylamine. It is a further object to provide an apparatus and process whereby thiodiphenylamine may be continuously produced and flaked. Further objects will become apparent hereinafter.

Figure 1:
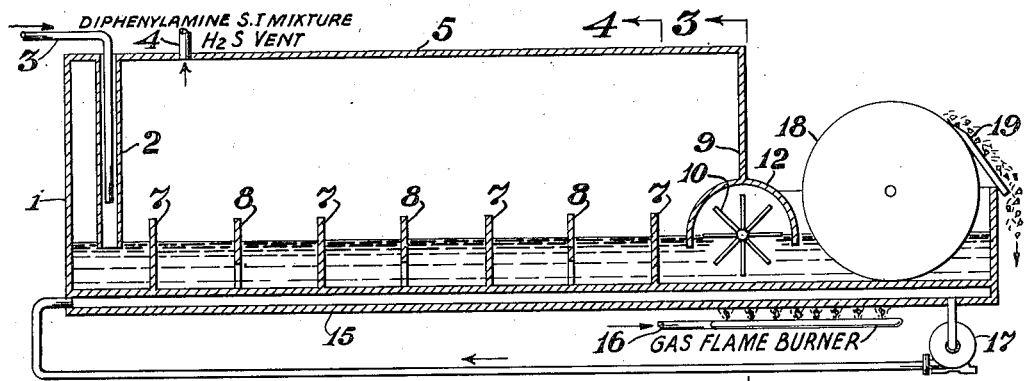
Figure 1 shows an elevation in section of an apparatus of the invention.
Figure 2:
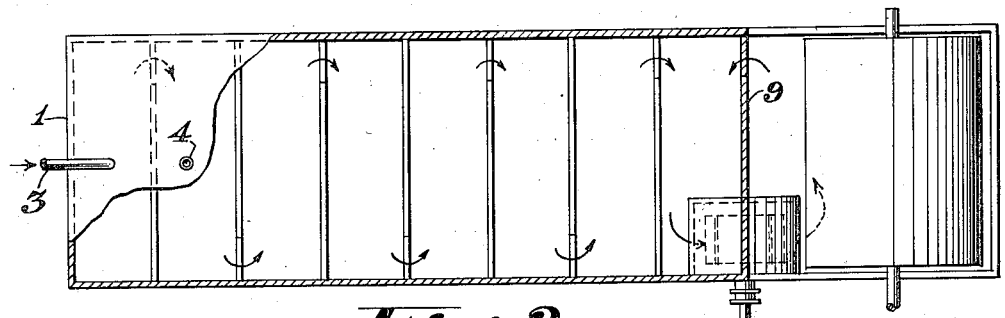
Figure 2 is a plan partly in section of the same apparatus.
Figures 3, 4:
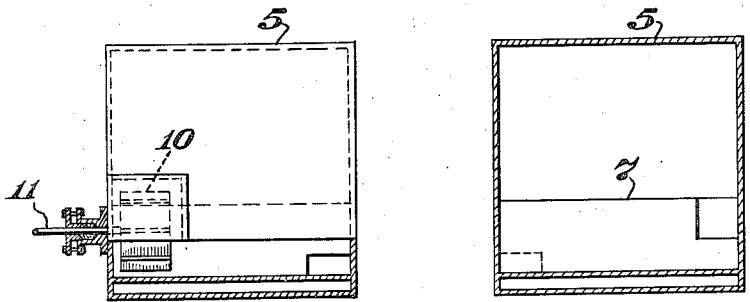
Figure 3 is a section taken on the line 3—3 of Figure 1.
Figure 4 is a section taken on the line 4—4 of Figure 1.

Referring more particularly to the drawing there will be seen a horizontal receptacle 1 which is provided at the entrance end with a vapor well 2. A mixture of diphenylamine, sulfur, and iodine are introduced through the vapor well by means of a pipe 3. Hydrogen sulfide released during the reaction is taken off through a vent 4 in the top 5 of the closed portion of the receptacle 1. The receptacle is provided along the portion which is closed by the top 5 with transversely located baffle plates 7 and 8. As will be more clearly seen in Figure 4, the baffle plates 7 are provided with an opening at the upper right-hand corner. The baffle plates numbered 8 are similar but the opening is at the bottom and is in the opposite end of the plate. This arrangement of plates requires the reacting mixture to follow a circuitous path as it progresses longitudinally along the receptacle.

The last plate 9 is similar to the others but it extends to the top 5 and provides an end closure for the receptacle. As is more clearly seen in Figure 3, this plate 9 is provided with an opening at the lower right-hand end.

A paddle wheel 10 is provided, mounted suitably upon a shaft 11. The wheel is provided with a housing 12 which prevents the escape of gas from the main reaction chamber.

Below the receptacle 1 there is provided a jacket 15 which contains a suitable heat exchange fluid such as oil. The fluid is heated by a gas burner 16 and is caused to circulate by a pump 17.

At the exit end of the reaction vessel there is provided a water-cooled flaker drum 18 with a doctor blade 19 which scrapes cooled flake from the drum. The flaked thiodiphenylamine removed from the drum is discharged into a suitable receptacle.

In operation a mixture of 169 parts by weight of diphenylamine, 64 parts by weight of sulfur, and 1 part by weight of iodine is melted and the molten mixture is fed continuously through the pipe 3 into the well 2. The material proceeds circuitously along the reaction vessel and any hydrogen sulfide produced is vented through the pipe 4. The paddle wheel 10 keeps the material at the exit end circulating so that there is no local cooling and no local overheating while the product is standing and waiting to be flaked.

While I have shown an illustrative embodiment of the invention it will be understood that the invention is not to be limited thereby since one skilled in the art may readily devise numerous equivalent structures without departing from the spirit of this invention.

I claim:

1. An apparatus, useful for the production of thiodiphenylamine by a liquid phase reaction of diphenylamine and sulfur, which comprises a horizontal receptacle for a fluid reaction mixture, an inlet means for reactants at one end of the receptacle, baffles disposed transversely of said receptacle for a major portion of the length of said receptacle and dividing said major portion of said receptacle into compartments to require said fluid reaction mixture to follow a circuitous path, a cover for said receptacle extending for a major portion of its length and enclosing the portion of said receptacle containing said baffles, a gas vent in said cover, a flaking drum disposed in the uncovered portion of said receptacle to dip into said fluid reaction mixture, an agitator positioned adjacent the uncovered end of the receptacle for circulating said fluid reaction mixture between the uncovered portion of said receptacle and the compartment in the covered portion of said receptacle adjacent the uncovered portion of said receptacle, and a means for heating said receptacle.

2. An apparatus, useful for the production of thiodiphenylamine by a liquid phase reaction of diphenylamine and sulfur, which comprises a horizontal receptacle for a fluid reaction mixture with a cover extending for a major portion of the length of said receptacle, an inlet pipe for reactants at one end of said receptacle, baffles disposed transversely of said receptacle within the portion enclosed by said cover dividing that portion of said receptacle into compartments to require said fluid reaction mixture to follow a circuitous path from the point of introduction to the opposite end, a gas vent in said cover, an agitator positioned adjacent the uncovered end of the receptacle for circulating said fluid reaction mixture between the uncovered end of said receptacle and the compartment in the covered portion adjacent said uncovered end, a flaking drum disposed in the uncovered end of said receptacle to dip into said fluid reaction mixture, a heating jacket on the receptacle, and a means for heating and a means for circulating a heat exchange medium in said jacket.

MAX L. HARBAUGH.

REFERENCES CITED

The following references are of record in the file of this patent:

UNITED STATES PATENTS

| Number | Name | Date |
|---|---|---|
| 286,526 | Bernthsen | Oct. 9, 1883 |
| 685,435 | Ruschhaupt | Oct. 29, 1901 |
| 1,298,960 | Kadish | Apr. 1, 1919 |
| 1,321,013 | Davis | Nov. 4, 1919 |
| 1,700,578 | Bacon | Jan. 29, 1929 |
| 1,760,246 | Maker et al. | May 27, 1930 |
| 2,217,566 | Smith | Oct. 8, 1940 |
| 2,295,074 | Britton | Sept. 8, 1942 |
| 2,360,295 | Widiger | Oct. 10, 1944 |